United States Patent
Hoch et al.

(10) Patent No.: US 7,552,289 B2
(45) Date of Patent: Jun. 23, 2009

(54) METHOD AND APPARATUS FOR ARBITRATING ACCESS OF A SERIAL ATA STORAGE DEVICE BY MULTIPLE HOSTS WITH SEPARATE HOST ADAPTERS

(75) Inventors: John Stuart Hoch, Santa Clara, CA (US); Mohammad Farooq Rydhan, San Jose, CA (US); Yee-Hsiang Sean Chang, Cupertino, CA (US)

(73) Assignee: Rasilient, Inc., Sunnyvale, CA (US)

( * ) Notice: Subject to any disclaimer, the term of this patent is extended or adjusted under 35 U.S.C. 154(b) by 0 days.

(21) Appl. No.: 10/108,765

(22) Filed: Mar. 26, 2002

(65) Prior Publication Data

US 2005/0251588 A1  Nov. 10, 2005

Related U.S. Application Data

(60) Provisional application No. 60/349,514, filed on Jan. 18, 2002.

(51) Int. Cl.
*G06F 12/00* (2006.01)

(52) U.S. Cl. .................. 711/151; 710/107; 710/240; 718/104

(58) Field of Classification Search .................. 711/151
See application file for complete search history.

(56) References Cited

U.S. PATENT DOCUMENTS

| 5,334,952 | A | * | 8/1994 | Maddy et al. | ............... | 331/1 A |
| 5,884,055 | A | * | 3/1999 | Tung et al. | .................. | 710/307 |
| 6,141,715 | A | * | 10/2000 | Porterfield | ................... | 710/113 |
| 2002/0087898 | A1 | * | 7/2002 | Bormann et al. | ............ | 713/300 |
| 2002/0159311 | A1 | * | 10/2002 | Coffey et al. | ............... | 365/200 |
| 2003/0135577 | A1 | * | 7/2003 | Weber et al. | ................ | 709/214 |

OTHER PUBLICATIONS

Serial ATA: High Speed Serialized AT Attachment, Rev. 1.0, Aug. 29, 2001. pp. 12, 87-88, 111, 117-124.*

* cited by examiner

*Primary Examiner*—Brian R. Peugh
*Assistant Examiner*—Matthew Bradley
(74) *Attorney, Agent, or Firm*—Venture Pacific Law, P.C.

(57) ABSTRACT

An adapter unit operative to support access of an SATA storage device by a plurality of hosts associated with separate host adapters. The adapter unit includes a multiplexer coupled to an arbiter. The multiplexer receives a plurality of sets of communication signals, one signal set for each host adapter. The multiplexer then selects one of the signal sets based on a control signal and couples the selected signal set to its output. The arbiter receives requests from the hosts to access the SATA storage device, selects a particular requesting host, and provides the control signal indicative of the specific host granted access. The host adapter for the granted host and the SATA storage device are placed in a PHY READY power management state, prior to a read or write access, and are placed in a PARTIAL power management state after the read or write access.

22 Claims, 5 Drawing Sheets

METHOD AND APPARATUS FOR ARBITRATING ACCESS OF A SERIAL ATA STORAGE DEVICE BY MULTIPLE HOSTS WITH SEPARATE HOST ADAPTERS

CROSS-REFERENCES TO RELATED APPLICATION

This application claims the benefit of U.S. provisional Application Ser. No. 60/349,514, entitled "Method and Apparatus for Two Hosts with Separate Host Adapters to Access a Single Serial ATA Disk Drive," filed Jan. 18, 2002, which is incorporated herein by reference in its entirety for all purposes.

BACKGROUND OF THE INVENTION

The present invention relates generally to data storage, and more specifically to techniques for allowing multiple hosts with separate host adapters to access a Serial ATA storage device.

Hard disk drives are widely used to provide mass storage for various computing applications. Various disk drive designs are commercially available, each of which may be tailored for a specific application and designed to meet certain requirements. For example, low-cost disk drives are available for personal computers (PCs), high-capacity disk drives are available for network servers and mainframes, Redundant Array of Independent Disks (RAID) are available for high-reliability storage, and so on.

A new data link interface for storage devices was recently promulgated by a consortium of computer and disk drive vendors, including APT Technologies, Inc., Dell Computer Corporation, IBM Corporation, Intel Corporation, Maxtor Corporation, and Seagate Technology. This new interface is referred to as Serial Advanced Technology Attachment (Serial ATA or SATA), and is designed to provide certain advantages, including high transfer rate, ease of connectivity, simplicity of use, and so on.

The specification for SATA is defined in a document entitled "Serial ATA High Speed Serialized AT Attachment," which is referred to herein as the SATA specification and incorporated herein by reference. Revision 1.0 of the SATA specification was released by the consortium on Aug. 29, 2001 and is publicly available. The SATA specification defines the interface between a host adapter and a mass-storage device including a physical layer, a link layer, and a transport layer. An example of a host adapter is an integrated circuit that includes a Serial ATA controller with a PCI interface. An example of a mass-storage device is a Serial ATA hard-disk drive. The Serial ATA is intended as a high-speed replacement for parallel ATA. Three different generations are defined by the SATA specification: Generation 1 operating at a data rate of 1.5 Gigabits per second (Gbps), Generation 2 operating at 3.0 Gbps, and Generation 3 operating at 6.0 Gbps.

The SATA specification defines a point-to-point connection between a host adapter and a mass-storage device. This connection is not intended to be shared. Considering only the signal connections, and not the power connections or legacy connections, the SATA specification defines seven signals that couple the host adapter to the mass-storage device. The seven SATA signals are three ground signals, a differential transmit pair for data transfer from the host adapter to the device, and a differential receive pair for data transfer from the device to the host adapter. The two differential pairs carry the point-to-point serial data streams. The SATA specification also illustrates the physical connection for these seven signals as either a cabled connection or a direct connection. In a cabled configuration, a cable is used to connect a signal plug connector on the device to a signal plug connector associated with the host adapter. In a direct connection, the signal plug connector on the device is directly connected to a receptacle connector associated with the host adapter.

The SATA specification does not discuss nor provide a specific scheme to enable two hosts to access the same SATA storage device. In a high-availability storage system, it is desirable for the same device to be accessible by two or more different hosts. If one host fails, then another host can still access the device. In this way, the system is still operational because of the redundancy.

If multiple hosts can share a single host adapter, then these hosts can access the same SATA device by obtaining exclusive access to the shared host adapter. Typically, the exclusive access to the host adapter needs to be maintained during the entire read or write process, including command setup, command execution, and command completion.

In certain situations, it is desirable to have two or more hosts with separate host adapters gain access to the same SATA device. Support for this configuration is made challenging by the fact that the SATA signals between the host adapter and the SATA device are typically permanent connections that are not easily switched or reconnected. This arises from one of the stated goals in the SATA specification: single-host operation.

As can be seen, there is a need for techniques to allow multiple hosts with separate host adapters to access a Serial ATA storage device.

SUMMARY OF THE INVENTION

Techniques are provided herein to allow multiple hosts with separate host adapters to access a single Serial ATA storage device (e.g., an SATA hard-disk drive). The signaling or "handshaking" defined by the SATA specification to place the host adapter and the SATA device into the proper state is exploited and used along with an "adapter unit" (described below) to implement a multiple-access scheme for the SATA device. (The adapter unit is different from the host adapter.) Each host can independently request access to the SATA device without knowledge of the other hosts. Only one host is granted access to the SATA device at any given moment. After receiving an access grant, the host granted access to the SATA device issues the appropriate signaling to prepare for access. The granted host can then perform a read or write access in the normal manner contemplated by the SATA specification. In the last step, the host adapter of the granted host and the SATA device are returned to the proper state, and another host can thereafter access the SATA device.

An embodiment of the invention provides an adapter unit operative to support access of an SATA storage device by a plurality of hosts associated with separate host adapters. The adapter unit includes a multiplexer coupled to an arbiter. The multiplexer receives a plurality of sets of communication signals, one signal set for each of a plurality of host adapters. The multiplexer then selects one of the signal sets based on a control signal and couples the selected signal set to its output. The arbiter receives requests from the hosts to access the SATA storage device, selects a particular requesting host to grant access, and provides the control signal indicative of the specific host granted access to the SATA storage device. In an embodiment, the host adapter for the granted host and the SATA storage device are (1) each placed in a PHY READY power management state, prior to a read or write access, via an exchange of a COMWAKE signal, and (2) each placed in a PARTIAL power management state after the read or write access. The arbiter may further include a timer used to time-out an access grant. The adapter unit is described in further detail below. The PHY READY and PARTIAL power management states and the COMWAKE signal are described in the SATA specification.

Another embodiment of the invention provides a method for supporting access to an SATA storage device by a plurality of hosts associated with separate host adapters. In accordance with the method, requests from the hosts to access the SATA storage device are received, and a particular requesting host is selected to be granted access. A control signal indicative of the specific host granted access to the SATA storage device is then provided. A plurality of sets of communication signals, one signal set for each of a plurality of host adapters, is also received and one of the signal sets is selected based on the control signal and coupled to the SATA storage device. Again, the host adapter for the granted host and the SATA storage device are (1) placed in the PHY READY power management state, prior to a read or write access, via an exchange of the COMWAKE signal, and (2) placed in the PARTIAL power management state after the read or write access.

Various other aspects, embodiments, and features of the invention are also provided, as described in further detail below.

The foregoing, together with other aspects of this invention, will become more apparent when referring to the following specification, claims, and accompanying drawings.

DESCRIPTION OF THE SPECIFIC EMBODIMENTS

Figure 1:
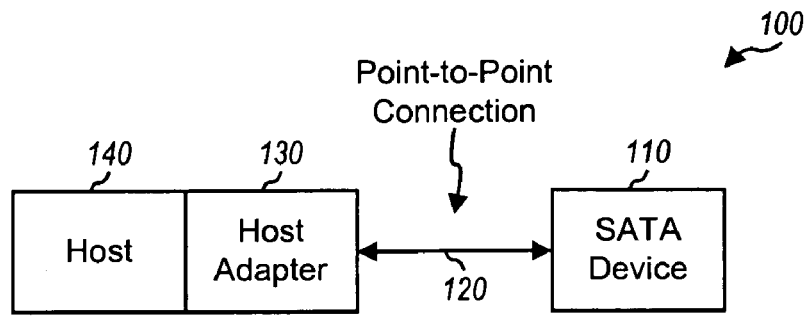
FIG. 1 is a diagram of a system with a point-to-point interconnection for an SATA device, as contemplated by the SATA specification.

FIG. 1 is a diagram of a system 100 with an interconnection for an SATA device 110, as contemplated by the SATA specification. SATA device 110 couples to a host adapter 130 via a point-to-point connection 120. The SATA specification defines the point-to-point connection as comprising three ground signals, a differential transmit pair, and a differential receive pair, all of which may be provided via a single cable. Host adapter 130 further interfaces with a host 140 and supports data retrieval and storage for host 140 with SATA device 110.

Each of the units in FIG. 1 may be implemented in various ways. For example, host adapter 130 may be implemented as an integrated circuit that includes a Serial ATA controller for interfacing with SATA device 110 and a PCI interface for interfacing with host 140. SATA device 110 may be a Serial ATA hard-disk drive or some other type of mass-storage device.

As noted above, the SATA specification does not discuss nor provide a specific scheme to enable multiple hosts with separate host adapters to access the same mass-storage device. This may be highly desirable in a high-availability storage system, whereby redundant hosts and host adapters can be used to assure continued system operation even if one or more hosts fail.

An aspect of the invention provides techniques to allow multiple hosts with separate host adapters to access a single SATA device (e.g., an SATA hard-disk drive). Each host can independently request access to the SATA device without knowledge of the other hosts. Only one host is granted access to the SATA device at any given moment. After receiving an access grant, the host granted access to the SATA device issues the appropriate signaling to prepare for access (as described below). The granted host can then perform a read or write access. In the last step, the granted host returns its host adapter and the SATA device back to the proper state, and another host can thereafter access the SATA device.

The signaling or "handshaking" defined by the SATA specification to place the host adapter and the SATA device into the proper state is exploited and used along with an "adapter unit" (described below) to implement a multiple-access scheme for the SATA device, which is based on point-to-point connection technology. In general, the specific signaling to be sent to or by each host granted access to the SATA device are dependent on the standard and/or design being implemented. Details for various aspects and embodiments are described below.

The inventive techniques recognize that exclusive access is not needed between the host adapter and the SATA device. Rather, all that is needed is for the SATA signals for the SATA device to be coupled to a granted host adapter (i.e., the one granted access to the SATA device). These SATA signals are thus sometimes coupled to one host adapter and sometimes to another host adapter. To support N hosts with separate host adapters, N sets of SATA signals from these host adapters may be combined in such a manner to guarantee that the granted host adapter is coupled to the SATA drive at the proper time.

Figure 2:
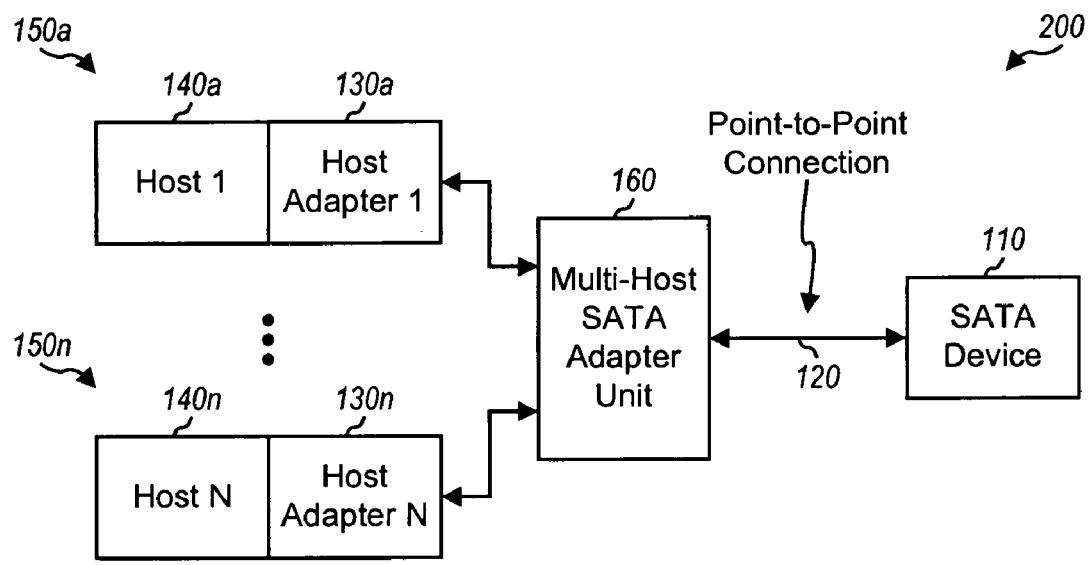
FIG. 2 is a diagram of a system that supports access of a single SATA device by multiple hosts with separate host adapters, in accordance with an embodiment of the invention.

FIG. 2 is a diagram of a system 200 that supports access of a single SATA device 110 by multiple hosts with separate host adapters, in accordance with an embodiment of the invention. In system 200, a number of hosts 140a through 140n are intended to share access to a single SATA device 110. In the embodiment shown in FIG. 2, each host 140 is associated with a respective host adapter 130, and the pair forms a host/host adapter combination 150. In some other embodiments, multiple hosts may also share any one of the host adapters. As shown in FIG. 2, host adapters 130a through 130n couple to a multi-host SATA adapter unit 160, which further couples to SATA device 110 via point-to-point connection 120. In general, any number of host adapters 130 may be supported by SATA adapter unit 160.

Multi-host SATA adapter unit 160 includes circuitry that can interconnect multiple host adapters 130, one at any given moment, to SATA device 110. SATA adapter unit 160 further includes circuitry that controls and arbitrates access to the SATA device. Various designs may be used for SATA adapter unit 160, one of which is described below.

Figure 3:
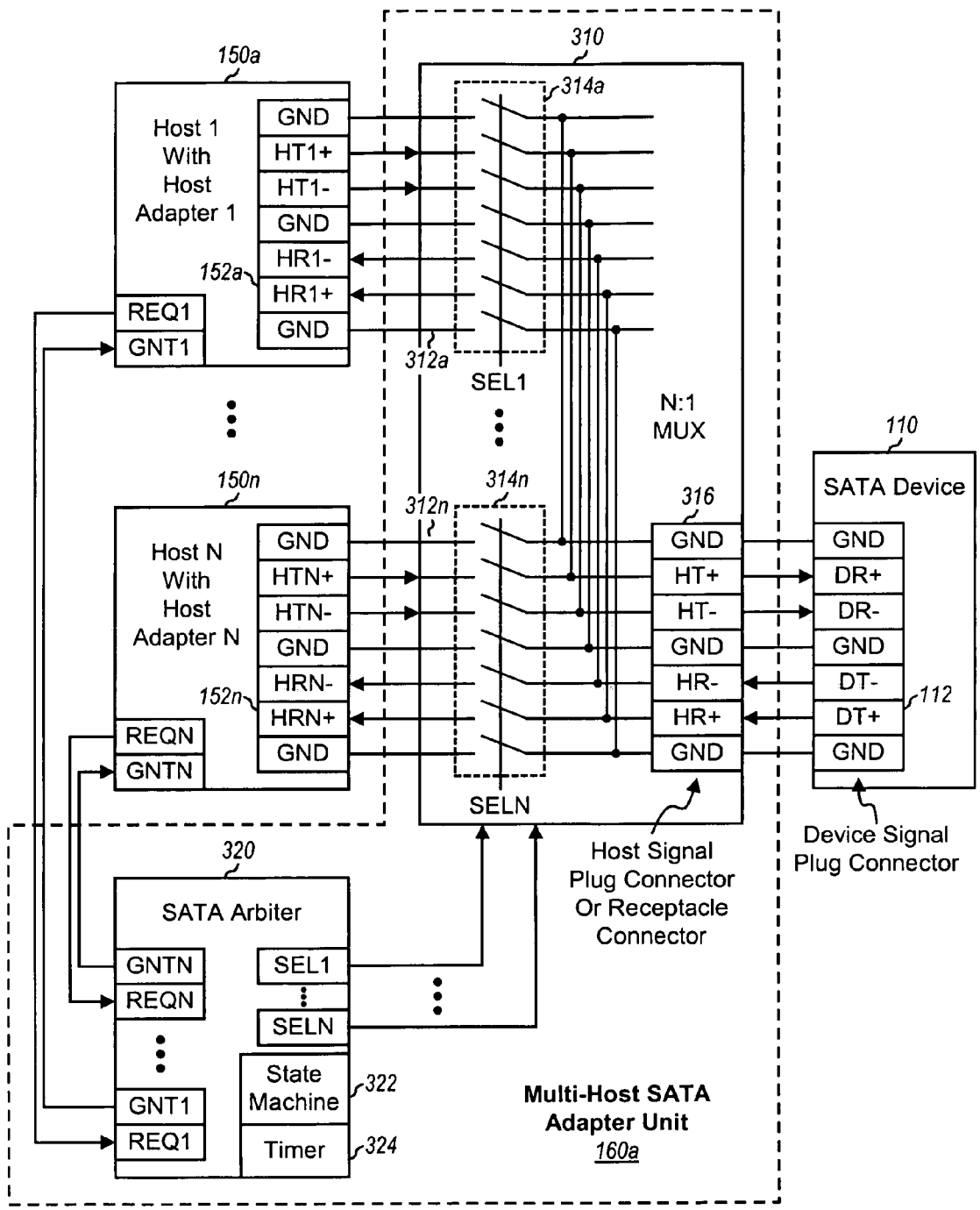
FIG. 3 is a diagram of a multi-host SATA adapter unit.

FIG. 3 is a diagram of a multi-host SATA adapter unit 160a, which is a specific embodiment of multi-host SATA adapter unit 160 in FIG. 2. In this embodiment, SATA adapter unit 160a includes an N:1 multiplexer 310 coupled to an SATA arbiter 320. In general, N can be any integer value two or greater (e.g., N=2).

Multiplexer 310 includes N sets of inputs 312a through 312n, each of which may be coupled to a respective set of SATA signals for one host adapter of a host/host adapter combination 150. Multiplexer 310 can thus couple to N host adapters simultaneously. Multiplexer 310 also includes a set of outputs that couples to a signal plug connector or a receptacle connector 316, which further couples to SATA device 110 via a cable or direct connection. Based on the control signals from SATA arbiter 320, multiplexer 310 selects one of the N sets of SATA signals and interconnects the selected signal set for the granted host adapter to the multiplexer output.

The SATA specification defines seven SATA signals for the interconnection between the host adapter and the SATA device. Only the signal connections for the SATA device are shown in FIG. 3, and the power connections and the legacy connections are not shown for simplicity. Of the seven signal connections, two connections (HTx+ and HTx− for "host transmit" at the host adapter, and DRx+ and DRx− for "device receive" at the SATA device) are used for the differential signal pair to transfer data from the host adapter to the SATA device, two connections (HRx+ and HRx− for "host receive" at the host adapter, and DTx+ and DTx− for "device transmit" at the SATA device) are used for the differential signal pair to transfer data from the SATA device to the host adapter, and three connections (GND) are used for ground.

FIG. 3 also shows an example implementation of N:1 multiplexer 310. In this design, multiplexer 310 includes N sets of switches 314a through 314n. Each set includes seven switches and is controlled by a respective select (SELx) control signal, where x=1, 2, ... N. In the embodiment shown in FIG. 3, the SEL1 through SELN control signals are provided by SATA arbiter 320. Only one of these control signals is asserted at any given moment (if at all) by the SATA arbiter. If the SELx control signal for a given set of switches is asserted (i.e., logic high), then the switches in that set are closed, and the SATA signals from the host adapter coupled to that set of switches are routed to the multiplexer output and coupled to the signal plug connector on the SATA device. The remaining N−1 sets of switches are open, and the SATA signals from these other host adapters are left floating.

For a 2:1 multiplexer (i.e., N=2), the SEL1 control signal may be generated by inverting the SEL2 signal with an inverter. If the SEL2 signal is negated (i.e., logic low), then the SEL1 signal is asserted (i.e., logic high), the top set of seven switches is closed, and the SATA signals from host adapter 1 are coupled to the signal plug connector on the SATA device. In that case, the bottom set of seven switches is open, and the SATA signals from host adapter 2 are not coupled to anything. Conversely, if the SEL2 signal is asserted (i.e., logic high), then the SATA signals from host adapter 2 are coupled to the signal plug connector on the SATA device, but the SATA signals from host adapter 1 are left floating.

The switches are selected and/or designed to provide the required performance. In particular, the bandwidth of the switches needs to be wide enough to pass the SATA signals. For example, to support a Generation-1 SATA device, the switches need to be able to pass 1.5 GHz signals. The switches may be implemented with simple CMOS transmission gates (or CMOS switches) to switch Generation-1 signals. An example of one such CMOS switch is a "High Performance CMOS Two Channel 5PST Switch" (part number IDTQS4A110) from Integrated Device Technology Inc., which is commercially available.

In the embodiment shown in FIG. 3, a set of seven switches is used for each host adapter, in which case multiplexer 310 includes a total of 7·N switches. The number of switches may be reduced without impairing performance. Each set of switches includes four switches for two differential data pairs and three switches for ground. The switches for ground for all N host adapters may be eliminated or reduced. For example, the three ground signals from each host adapter may be tied to a ground plane on a printed circuit board. This circuit board would also include the host signal plug connector 316 that is ultimately coupled to the signal plug connector 112 on the SATA device. The three ground signals on this host signal plug connector would also be tied to the same ground plane. Thus, by using the ground plane on the circuit board for all ground signals, three switches in each set may be eliminated.

Other implementations of the N:1 multiplexer are possible, and this is within the scope of the invention. Moreover, other types of circuit (besides an N:1 multiplexer) may also be used to provide the function of selectively coupling a selected set of signals from a granted host adapter to the SATA device.

SATA arbiter 320 provides the SEL control, which is used to generate the SELx signals for the N sets of switches within multiplexer 310. SATA arbiter 320 and multiplexer 310 collectively determine which one of the N hosts is allowed to access the shared SATA device. Only one host is allowed to access the SATA device at any given moment since the SATA specification does not support simultaneous access.

SATA arbiter 320 may be implemented with various designs. Each design may call for certain control signals between SATA arbiter 320 and hosts 140a through 140n for requesting and arbitrating access to the common SATA device.

FIG. 3 also shows a specific embodiment of SATA arbiter 320. In this embodiment, each host desiring access to the SATA device generates an access request, which is then provided via a dedicated request signal to the SATA arbiter. In an embodiment, a host can request access to the SATA device by asserting its request signal. The request signal from host x is labeled as REQx, where x=1, 2, ... N. In an embodiment, each REQ signal may be asserted independently by the corresponding host whenever access of the SATA device is desired, without knowledge or restriction as to the state of the REQ signals for the other N−1 hosts. Thus, the REQ signals for multiple hosts may be asserted at the same time.

SATA arbiter 320 receives the REQ signals from the N hosts and arbitrates access to the SATA device based on a particular arbitration scheme. In one embodiment, SATA arbiter 320 implements a fair arbitration scheme whereby (1) each host is equally likely to be granted access to the SATA device, and (2) access to the SATA device is granted on a first-come first-serve basis. For this scheme, SATA arbiter 320 monitors the N REQ signals and grants access to the first host to assert its REQ signal. If multiple REQ signals are asserted at approximately the same time (or within a particular time window such that the SATA arbiter is not able to ascertain which REQ signal was asserted first), then the SATA arbiter decides and selects one of these transitions as the first.

Based on the request inputs and the implemented arbitration scheme, the SATA arbiter determines which host to grant access to the SATA device and asserts a grant signal for the selected host. The grant signal for host x is labeled as GNTx, where x=1, 2, ... N. Since only one host may be granted access to the SATA device at any given moment, the SATA arbiter only asserts the GNT signal for one host at any moment.

For the fair arbitration scheme, if multiple REQ signals are asserted, then the SATA arbiter asserts the GNT signal for the REQ signal that is asserted first. For example, if N=2 and both REQ1 and REQ2 signals are asserted by the two hosts, then the SATA arbiter asserts the GNT1 signal to grant access to host 1 if the REQ1 signal was asserted before REQ2 signal. Alternatively, the SATA arbiter asserts the GNT2 signal to grant access to host 2 if the REQ2 signal was asserted before the REQ1 signal. If the GNT1 signal is asserted, then the SEL control from the SATA arbiter also asserts the SEL1 signal and negates the SEL2 signal, and host 1 is then assured that the SATA signals from host adapter 1 are connected to the device signal plug connector. Alternatively, if the GNT2 signal is asserted, then the SEL control from the SATA arbiter also asserts the SEL2 signal and negates the SEL1 signal, and host 2 is then assured that the SATA signals from host adapter 2 are coupled to the device signal plug connector. The SATA arbiter does not assert multiple GNT signals at any given time.

If no host requests access to the SATA device, then none of the GNT signals will be asserted by the SATA arbiter. In that case, no host can be certain that the SATA signals from its host adapter are coupled to the SATA device.

In the embodiment shown in FIG. 3, SATA arbiter 320 communicates with each host via a dedicated pair of REQ and GNT signals. Other types of interface between SATA arbiter 320 and the hosts may also be implemented, and this is within the scope of the invention. For example, SATA arbiter 320 may couple to the N hosts via a common (two-wire or three-wire) serial bus interface (e.g., in a daisy chain manner). For this serial bus interface, the SATA arbiter and each host may be assigned a separate address, and messages may be specially addressed to each unit coupled to the serial bus interface by designating the recipient using its assigned address.

In one implementation, each of the N sets of switches 314 is controlled by a respective SELx signal. This then allows the SATA arbiter to select and enable one set of switches or no set of switches. In another implementation, one set of switches is marked as a default set and is enabled if no host request access. For example, for N=2, if the SEL1 signal is generated by inverting the SEL2 signal, then either the SEL1 or SEL2 signal will be asserted at any given moment, and the SATA signals from one of the two host adapters will be coupled to the host signal plug connector. In other words, one of the two sets of switches in the 2:1 multiplexer will always be closed, and the other set of switches will correspondingly be opened. Regardless of whether or not any set of switches is closed by default, each host can only assume that the SATA signals from its host adapter are coupled to the host signal plug connector when its GNT signal is asserted.

Multi-host SATA adapter unit 160 may be implemented in various ways. For example, adapter unit 160 may be implemented on a circuit card, a module, or some other unit. Adapter unit 160 may also be integrated as part of SATA device 110. The interconnections between the N sets of inputs for adapter unit 160 and the host adapters may also be achieved in various manners. For example, the interconnections between each host adapter connector 152 and its corresponding set of inputs 312 on multiplexer 310 may be implemented with traces on a printed circuit board (e.g., a backplane) or cables. The interconnections between the set of outputs for adapter unit 160 and the SATA device may also be implemented with printed circuit board traces or cables.

Signaling (or handshaking) is performed prior to and after accessing the SATA device. In particular, prior to accessing the SATA device, a host needs to issue a COMWAKE signal to force the physical layer of its host adapter and the physical layer of the SATA device into a PHY READY power management state. This COMWAKE signal is a specific signal pattern defined by the SATA specification and transmitted as an out-of-band (OOB) signal from the host adapter to the SATA device on the host transmit differential pair (HTx+ and HTx−). In particular, the COMWAKE signal is a sequence of six bursts of data separated by idle periods. The PHY READY and PARTIAL power management states and the COMWAKE signal are described in the SATA specification.

After the read or write is completed, the host needs to return the physical layer of its host adapter and the SATA device to a PARTIAL power management state. This is typically dependent on the specific design of the host adapter. According to the SATA specification, the host adapter and SATA device cannot take more than 10 μsec to transition from the PARTIAL power management state to the PHY READY state. While in the PARTIAL power management state, no communication exists between the host adapter and the SATA device. In particular, no SYNC primitives are passed back and forth between the host adapter and SATA device, as they would be in the PHY READY state. The N:1 multiplexer can therefore switch between one host adapter and another host adapter without disturbing any communication.

The COMWAKE signal and the PHY READY and PARTIAL power management states are described in detail in the SATA specification.

Figure 4:
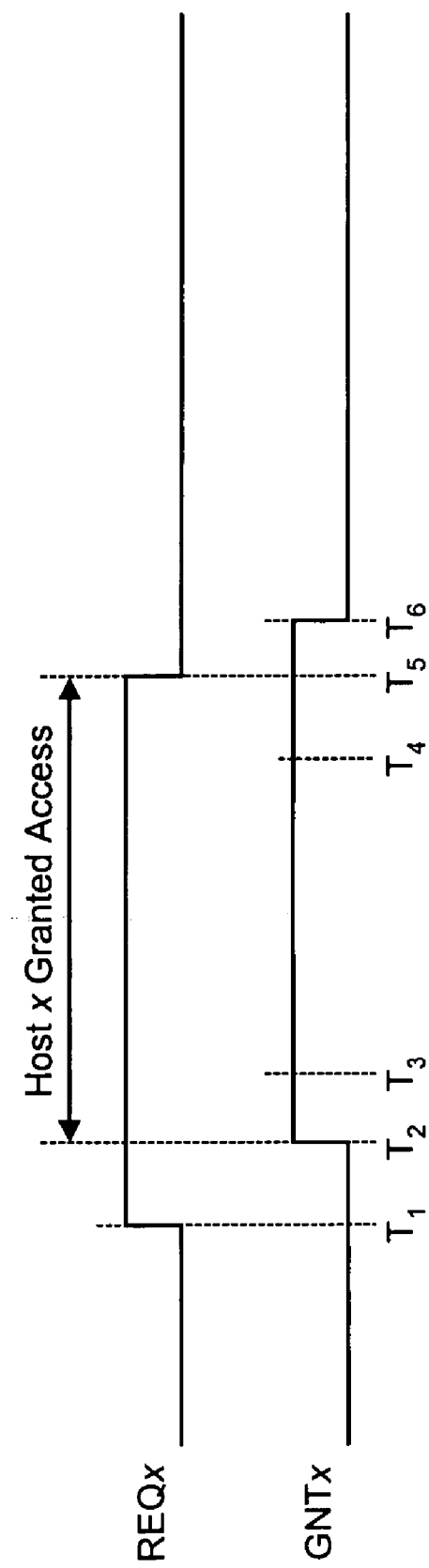
FIG. 4 is a timing diagram illustrating a request-and-grant process for a given host.

FIG. 4 is a timing diagram illustrating the details of a request-and-grant process for a given host x for the SATA arbiter embodiment shown in FIG. 3. FIG. 4 also shows when the COMWAKE signal is issued and when host adapter x and the SATA device are returned to the PARTIAL power management state.

Initially, at time $T_1$, host x desires access to the SATA device and asserts its REQx signal to send an access request to the SATA arbiter. The SATA arbiter receives and processes the REQx signal from host x as well as the REQ signals from the other N−1 hosts. The SATA arbiter then determines (1) whether or not any host is currently granted access to the SATA device, and (2) whether the request from host x is received before any and all requests that may have been received from the other N−1 hosts. If no host is currently granted access to the SATA device and the request from host x is received before those from the other hosts, then the SATA arbiter can grant host x access to the SATA device by asserting the GNTx signal for host x, at time $T_2$.

After receiving the access grant from the SATA arbiter via the assertion of the GNTx signal, host x issues a COMWAKE signal to force its host adapter and the SATA device into the PHY READY power management state, at time $T_3$. Thereafter, host x can read or write the SATA device in the normal manner contemplated by the SATA specification.

In one embodiment, host x is granted access to the SATA device as long as it asserts its REQx signal. Upon completion of the read or write, host x returns its host adapter and the SATA device to the PARTIAL power management state, at time $T_4$. Host x then negates its REQx signal, at time $T_5$. Upon receiving the negated REQx signal, the SATA arbiter correspondingly negates the GNTx signal to remove the access grant from host x and end the transaction, at time $T_6$.

Figure 5:
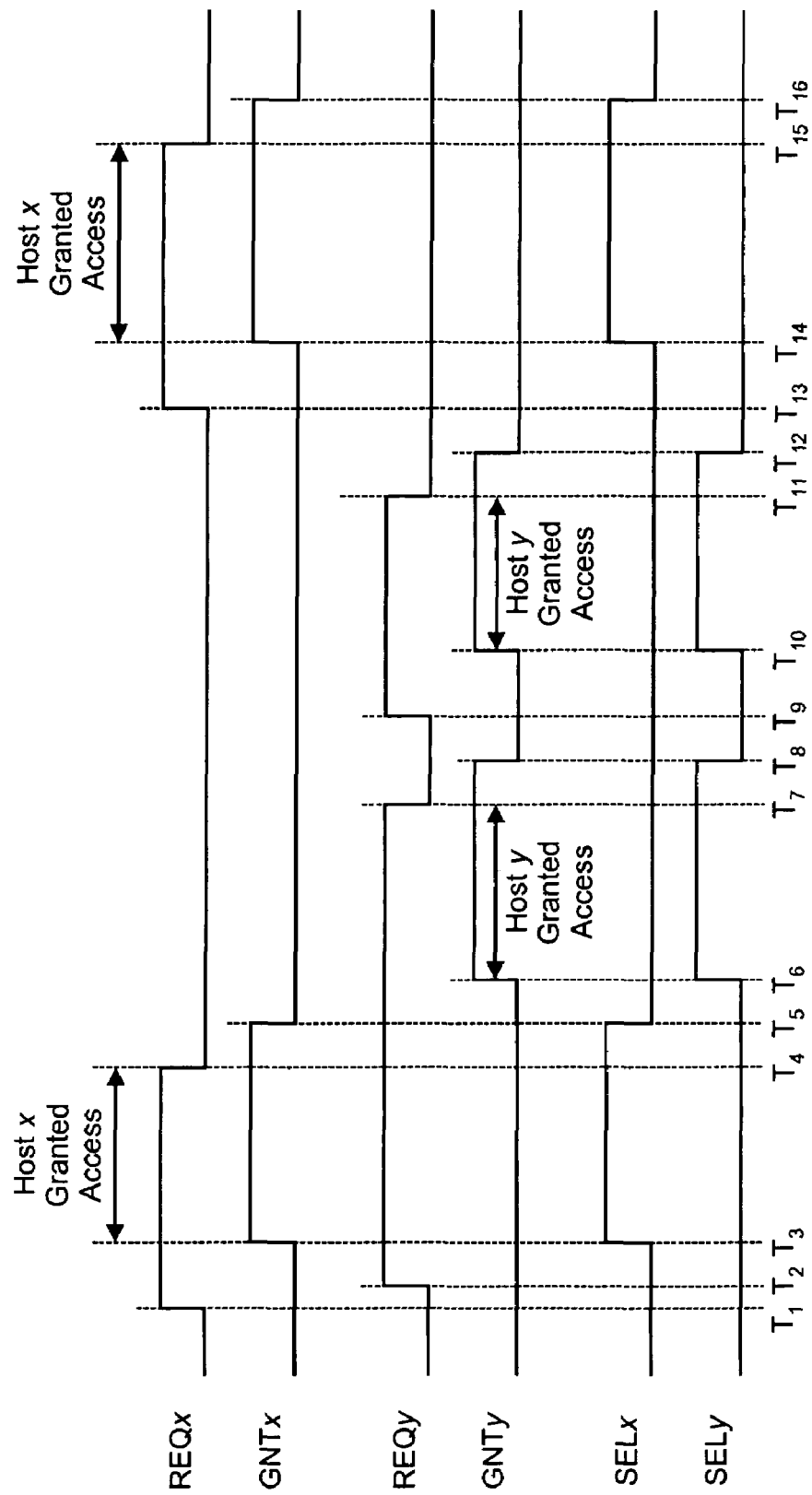
FIG. 5 is a timing diagram illustrating a request-and-grant process for two hosts.

FIG. 5 is a timing diagram illustrating the details of a request-and-grant process for two hosts x and y for the SATA arbiter embodiment shown in FIG. 3. Initially, at time $T_1$, host x desires access to the SATA device and asserts its REQx signal to send the grant request to the SATA arbiter. Shortly thereafter at time $T_2$, host y also desires access to the SATA device and asserts its REQy signal to send the grant request to the SATA arbiter. The SATA arbiter receives and processes the REQx signal from host x, the REQy signal from host y, and the REQ signals received from the other N−2 hosts. The SATA arbiter determines that no other host is currently granted access to the SATA device and that the REQx signal was asserted before the REQy signal. The SATA arbiter then grants host x access to the SATA device by asserting the GNTx signal for host x, at time $T_3$.

After receiving the access grant from the SATA arbiter via the assertion of the GNTx signal, host x issues a COMWAKE signal to force its host adapter and the SATA device into the PHY READY power management state. Thereafter, host x can read or write the SATA device in the normal manner. Upon completion of the read or write, host x returns its host adapter and the SATA device to the PARTIAL power management state and then negates its REQx signal, at time $T_4$. Upon receiving the negated REQx signal, the SATA arbiter correspondingly negates the GNTx signal to remove the access grant from host x and end the transaction, at time $T_5$.

In an embodiment, a host asserts its REQ signal as long as it desires access to the SATA device. Upon removing the access grant from host x, the SATA arbiter recognizes that host y still desires access to the SATA device and that no other unserved requests have been received from the other N−1 hosts before the request from host y. The SATA arbiter then grants host y access to the SATA device by asserting the GNTy signal for host y, at time $T_6$. Upon completion of the read or write, host y negates its REQy signal at time $T_7$. Upon receiving the negated REQy signal, the SATA arbiter correspondingly negates the GNTy signal, at time $T_8$.

At time $T_9$, host y again desires access to the SATA device and asserts its REQy signal. Since no other host is currently granted access to the SATA device and no other requests have been received prior to the request from host y, the SATA arbiter grants host y access to the SATA device and asserts the GNTy signal, at time $T_{10}$. Upon completion of the read or write, host y negates its REQy signal at time $T_{11}$, and the SATA arbiter correspondingly negates the GNTy signal at time $T_{12}$.

Thereafter, host x again desires access to the SATA device and asserts its REQx signal at time $T_{13}$. Since no other host is currently granted access to the SATA device and no other requests have been received prior to the request from host x, the SATA arbiter grants host x access to the SATA device and asserts the GNTx signal, at time $T_{14}$. Upon completion of the read or write, host x negates its REQx signal at time $T_{15}$, and the SATA arbiter correspondingly negates the GNTx signal at time $T_{16}$.

As shown in FIG. 5, multiple hosts may desire access to the SATA device at approximately the same time, and the REQ signals from multiple hosts may be asserted at any given moment. In one embodiment, the SATA arbiter implements a first-come first-serve scheme whereby the host that requests access first is granted access to the SATA device. For example and as shown in FIG. 5, since host x asserts its REQx signal at time $T_1$ before host y asserts its REQy signal at time $T_2$, host x is granted access to the SATA device by the SATA arbiter.

In some other embodiments, other factors may also be considered by the SATA arbiter when granting access to the SATA device. For example, the priorities of the requesting hosts, the amount of time the requesting hosts have been granted access in recent time, and so on, may be considered by the SATA arbiter in determining which host to grant access.

As also shown in FIG. 5, the GNT signal for only one host is asserted (if at all) by the SATA arbiter at any given moment. For this embodiment, each host can determine whether or not it has been granted access to the SATA device by monitoring its GNT signal. Correspondingly, only one SEL signal for the host that has been granted access (if any) is asserted at any given moment. For a design in which the SATA arbiter may grant access to one of two hosts at any given moment (i.e., N=2), two SEL signals (e.g., SEL1 and SEL2) may be used to control the two sets of switches in a 2:1 multiplexer for the two hosts. For this design, a common SEL signal may be provided by the SATA arbiter and used within the 2:1 multiplexer to generate both of the SEL1 and SEL2 signals. For example, the SEL1 signal may be set equal to the common SEL signal, and the SEL2 signal may be set equal to the inverted common SEL signal. Since the common SEL signal is always either asserted or negated, either the SEL1 or SEL2 signal will be asserted, and one of the two host adapters will always be coupled to the device signal plug connector of the SATA device. However, for this design, access to the SATA device by host 1 is only guaranteed when the GNT1 signal is asserted. Similarly, access to the SATA device by host 2 is only guaranteed when the GNT2 signal is asserted A simple request-and-grant scheme, such as the ones shown in FIGS. 4 and 5, allows a given host to continue to read or write the SATA device as long as it asserts its REQ signal. This scheme may not be desirable for various reasons. First, a given host may continually "hog" the SATA device for an extended period of time, which may then be unfair to other hosts. Second, a problem may arise if a given host is granted access to the SATA device and subsequently encounters a failure, with its REQ signal still asserted.

Various designs may be used for the SATA arbiter to achieve various objectives. For example, the SATA arbiter may be designed to periodically check to determine whether or not a host that has been granted access to the SATA device subsequently fails with its REQ signal still asserted. This design can prevent any host from accidentally (or possibly intentionally) monopolizing the SATA device. A specific SATA arbiter design that can achieve this objective is described below.

Figure 6:
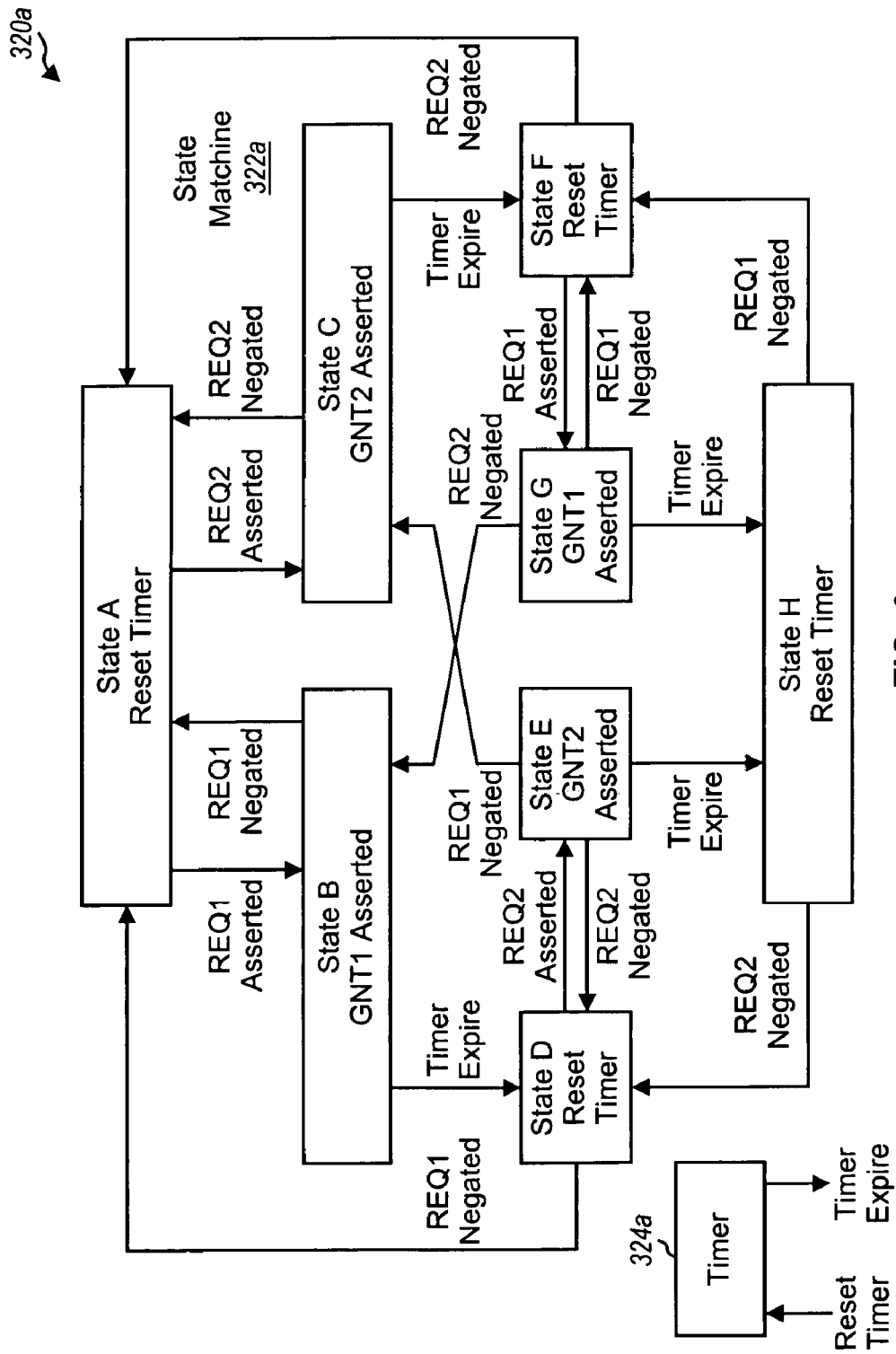
FIG. 6 is a state diagram of an SATA arbiter within the 2-host SATA adapter unit.

FIG. 6 is a state diagram of an SATA arbiter 320a, which is a specific embodiment of SATA arbiter 320 in FIG. 3. In this embodiment, SATA arbiter 320a includes a state machine 322a that comprises eight states used for arbitrating two hosts.

SATA arbiter 320a further includes timer 324a that provides timing information for state machine 322a. Timer 324a is used to prevent any given host from accidentally (or possibly intentionally) monopolizing the SATA device. Timer 324a may be maintained in a reset state (e.g., set to zero) when no host has been granted access to the SATA device, and may be enabled by state machine 322a in conjunction with the assertion of a GNT signal indicating that access has been granted to a particular host. In an embodiment, if timer 324a expires on the granted host, then the SATA arbiter negates the GNT signal for this host, and no longer recognizes the assertion of the REQ signal from this host until it is first negated. The expiration of the timer may be used to indicate that the SATA arbiter believes that the host currently granted access to the SATA device has failed. In the normal case, the timer does not expire, and the host granted access to the SATA device completes a read or write transaction on its own by negating its REQ signal.

In normal operation, the state machine of the SATA arbiter is in state A, state B, or state C. State A is the idle state, and the timer is maintained at reset in state A. While in state A, if the REQ1 signal is asserted by host 1, then the state machine transitions to state B. State B is the grant state for host 1. While the state machine is in state B, the GNT1 signal is asserted and the timer is enabled and counts. In state B, if and when the REQ1 signal is negated by host 1, then the state machine returns to state A. Similarly, while in state A, if the REQ2 signal is asserted by host 2, then the state machine transitions from state A to state C. State C is the grant state for host 2, and the GNT2 signal is asserted while the state machine is in state C. In state C, if and when the REQ2 signal is negated by host 2, then the state machine returns to state A.

States D, E, F, and G are entered only if the timer expires, which is an abnormal condition. States D and E are a first pair, and states F and G are a second pair. There is no direct transition from any state in the first pair (i.e., states D and E) to any state in the second pair (i.e., states F and G).

If the state machine is in state B and the timer expires, then this indicates that the REQ1 signal was asserted too long. The state machine may then assume that host 1 is faulty and would then enter state D where the GNT1 signal for host 1 is negated. While in state D, the REQ1 signal from host 1 is no longer recognized until it is first negated, in which case the state machine transitions back to state A. However, while in state D, the state machine still recognizes the REQ2 signal from host 2. If the REQ2 signal from host 2 is received by the SATA arbiter while in state D, then the state machine transitions to state E to assert the GNT2 signal and enable the timer for host 2. State E is similar to state C, with the exception that the REQ1 signal from host 1 is not recognized while in state E.

In similar manner, if the state machine is in state C and the timer expires, then this indicates that the REQ2 signal was asserted too long. The state machine may similarly assume that host 2 is faulty and would then enter state F where the GNT2 signal for host 2 is negated. While in state F, the REQ2 signal from host 2 is no longer recognized until it is first negated, in which case the state machine transitions back to state A. However, while in state F, the state machine still recognizes the REQ1 signal from host 1. If the REQ1 signal from host 1 is received by the SATA arbiter while in state F, then the state machine transitions to state G to assert the GNT1 signal and enable the timer for host 1. State G is similar to state B, with the exception that the REQ2 signal from host 2 is not recognized while in state G.

State H is only entered if the timer expires on both host 1 and host 2, which is also an abnormal condition. If the timer expires while in state G, then this indicates that the REQ1 signal was asserted too long. Similarly, if the timer expires while in state E, then this indicates that the REQ2 signal was asserted too long. While in state H, the state machine assumes that both host 1 and host 2 are faulty. Neither REQ1 nor REQ2 signals are recognized until they are first negated. While in state H, the state machine transitions to state D upon negation of the REQ2 signal and transitions to state F upon negation of the REQ1 signal.

The state diagram shown in FIG. 6 may be used for two hosts. This state diagram may be extended to cover any number of hosts.

As shown in FIG. 6, timer 324a receives a control signal from state machine 322a to reset it, and provides a status signal indicating whether or not the timer has expired. The amount of time before the timer expires may be selected based on various considerations. Moreover, different expiration times may be used for different hosts.

The state machine and the timer of the SATA arbiter may be implemented in various manners. For example, the state machine for the desired state diagram may be implemented with digital logic, a processor, or some other processing unit, as is known by a person skilled in the art. The timer may be implemented with simple digital logic as a counter with a reset.

FIG. 6 shows a specific design of the SATA arbiter. Other designs may also be implemented, and this is within the scope of the invention.

The techniques described herein may also be adapted to implement a multiple-access scheme for other types of systems. Various types of interconnection are widely used to couple multiple devices. These interconnection types include, for example, bus, ring, point-to-point, and star interconnections. In general, bus and ring interconnections are well suited for multiple access, and protocols are readily available to support multiple access for these types of interconnections. However, point-to-point and star interconnections are generally used for dedicated connection between two devices. The techniques described herein may be used to implement multiple access for point-to-point and star interconnections, similar to that described above for the SATA point-to-point interconnection.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An adapter unit operative to support access of a Serial Advanced Technology Attachment (SATA) storage device by a plurality of hosts associated with separate host adapters, comprising:
   a multiplexer configured to receive a plurality of sets of communication signals, one signal set for each of a plurality of host adapters, to select one of the plurality of signal sets based on a control signal, and to couple the selected signal set to a multiplexer output; and
   an arbiter operatively coupled to the multiplexer and configured to receive requests from the plurality of hosts to access the SATA storage device, to select a host to grant access to the SATA storage device from among all hosts sending requests based on an arbitration scheme if multiple hosts send requests, to provide the control signal indicative of the host granted access to the SATA storage device, and to inform the host granted access of a status of a request sent by the host, and
   wherein the arbiter communicates with the plurality of host adapters via control signals used for arbitrating access to the SATA storage device, the control signals being different from the plurality of sets of communication signals between the SATA storage device and the plurality of host adapters.

2. The adapter unit of claim 1, wherein the host adapter for the granted host and the SATA storage device are each placed in a proper state, prior to a read or write access, via an exchange of a handshake signal.

3. The adapter unit of claim 2, wherein the host adapter for the granted host and the SATA storage device are each placed in a PHY READY power management state, prior to the read or write access, via an exchange of a COMWAKE signal.

4. The adapter unit of claim 3, wherein the host adapter for the granted host and the SATA storage device are each placed in a PARTIAL power management state after the read or write access.

5. The adapter unit of claim 1, wherein the multiplexer is operative to receive two sets of communication signals from two host adapters.

6. The adapter unit of claim 1, wherein the multiplexer includes a set of switches for each set of communication signals.

7. The adapter unit of claim 6, wherein each switch is implemented with a CMOS switch.

8. The adapter unit of claim 1, wherein the arbiter includes a state machine configured to maintain hosts not allowed to be granted access to the SATA storage device.

9. The adapter unit of claim 8, wherein the arbiter includes a timer configured to provide timing information for the state machine.

10. The adapter unit of claim 8, wherein a host granted access for a particular maximum time limit is placed among the hosts not allowed to be granted access to the SATA storage device.

11. The adapter unit of claim 1, wherein the arbiter includes a state machine configured to maintain hosts allowed to be granted access to the SATA storage device.

12. The adapter unit of claim 1, wherein the arbiter communicates with each of the plurality of host adapters via a separate set of control signals used for arbitrating access to the SATA storage device.

13. The adapter unit of claim 12, wherein each control signal set includes a request signal and a grant signal.

14. The adapter unit of claim 1 and implemented on a circuit card.

15. An adapter unit operative to support access of a Serial Advanced Technology Attachment (SATA) storage device by a plurality of hosts associated with separate host adapters, comprising:
  a multiplexer configured to receive a plurality of sets of communication signals, one signal set for each of a plurality of host adapters, to select one of the plurality of signal sets based on a control signal, and to couple the selected signal set to a multiplexer output; and
  an arbiter operatively coupled to the multiplexer and configured to receive requests from the plurality of hosts to access the SATA storage device, to select a particular requesting host to grant access, and to provide the control signal indicative of the host granted access to the SATA storage device, wherein the arbiter comprises a state machine configured to maintain hosts not allowed to be granted access to the SATA storage device, and wherein a host is removed from among the hosts not allowed to be granted access to the SATA storage device upon negating its grant request.

16. An adapter unit operative to support access of a Serial Advanced Technology Attachment (SATA) device by a plurality of hosts associated with separate host adapters, and configured to
  communicate with a plurality of host adapters via control signals used for arbitrating access to the SATA device, the control signals being different from a plurality of sets of communication signals between the SATA device and the plurality of host adapters;
  receive requests from the plurality of hosts to access the SATA device;
  select a host to grant access to the SATA device from among all hosts sending requests based on an arbitration scheme if multiple hosts send requests;
  inform the host granted access of a status of a request sent by the host;
  receive the plurality of sets of communication signals, one signal set for each of the plurality of host adapters;
  select, from among the plurality of signal sets, a signal set corresponding to the host granted access; and
  couple the selected signal set to an output of the adapter unit.

17. An adapter unit operative to support access of a Serial Advanced Technology Attachment (SATA) storage device by a plurality of hosts associated with separate host adapters, comprising:
  a multiplexer configured to receive a plurality of sets of communication signals, one signal set for each of a plurality of host adapters, to select one of the plurality of signal sets based on a control signal, and to couple the selected signal set to a multiplexer output; and
  an arbiter operatively coupled to the multiplexer and configured to receive requests from the plurality of hosts to access the SATA storage device, to select a host to grant access to the SATA storage device from among all hosts sending requests based on an arbitration scheme if multiple hosts send requests, to provide the control signal indicative of the host granted access to the SATA storage device, and to inform the host granted access of a status of a request sent by the host, and
  wherein the arbiter communicates with the plurality of host adapters via control signals used for arbitrating access to the SATA storage device, the control signals being different from the plurality of sets of communication signals between the SATA storage device and the plurality of host adapters, and wherein the host adapter for the granted host and the SATA storage device are each placed in a PHY READY power management state, prior to a read or write access, via an exchange of COMW AKE signal, and are each placed in a PARTIAL power management state after the read or write access.

18. A method of supporting access to a Serial Advanced Technology Attachment (SATA) storage device by a plurality of hosts associated with separate host adapters, comprising:
  communicating with a plurality of host adapters via control signals used for arbitrating access to the SATA storage device, the control signals being different from a plurality of sets of communication signals between the SATA storage device and the plurality of host adapters;
  receiving requests from the plurality of hosts to access the SATA storage device;
  selecting a host to grant access to the SATA storage device from among all hosts sending requests based on an arbitration scheme if multiple hosts send requests;
  informing the host granted access of a status of a request sent by the host;
  providing a control signal indicative of the host granted access to the SATA storage device;
  receiving the plurality of sets of communication signals, one signal set for each of the plurality of host adapters;
  selecting one of the plurality of signal sets based on the control signal; and
  coupling the selected signal set to the SATA storage device.

19. The method of claim 18, further comprising:
  placing the host adapter for the granted host and the SATA storage device in a PHY READY power management state, prior to a read or write access, via an exchange of a COMW AKE signal on the selected signal set.

20. The method of claim 19, further comprising:
  placing the host adapter for the granted host and the SATA storage device in a PARTIAL power management state after the read or write access.

21. The method of claim 18, further comprising:
  maintaining a timer for the host granted access to the SATA storage device; and
  removing the grant from the host if access has been granted for a particular maximum time limit.

22. The method of claim 18, wherein the plurality of hosts is granted access to the SATA storage device based on a fair arbitration scheme.

* * * * *